(12) United States Patent
Zhong et al.

(10) Patent No.: US 11,098,762 B1
(45) Date of Patent: Aug. 24, 2021

(54) TWO-PIECE HYBRID BEARING CAGE ASSEMBLY

(71) Applicant: Schaeffler Technologies AG & Co. KG, Herzogenaurach (DE)

(72) Inventors: Guihui Zhong, Charlotte, NC (US); Michael Heaton, Rock Hill, SC (US); Dennis Roffe, Fort Mill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/818,190

(22) Filed: Mar. 13, 2020

(51) Int. Cl.
*F16C 33/38* (2006.01)
*F16C 19/06* (2006.01)

(52) U.S. Cl.
CPC .......... *F16C 33/3875* (2013.01); *F16C 19/06* (2013.01); *F16C 2226/74* (2013.01)

(58) Field of Classification Search
CPC .............. F16C 33/3831; F16C 33/3862; F16C 33/3868; F16C 33/3875; F16C 33/4611; F16C 33/4641; F16C 33/4647; F16C 33/4652
See application file for complete search history.

(56) References Cited

U.S. PATENT DOCUMENTS

| | | | | |
|---|---|---|---|---|
| 7,703,986 B2* | 4/2010 | Naito | ...................... | F16C 33/44 384/526 |
| 9,512,880 B2* | 12/2016 | Yasuda | ............... | F16C 33/3875 |
| 9,771,980 B2* | 9/2017 | Hayashi | .............. | F16C 33/4676 |
| 10,151,348 B2* | 12/2018 | Kamath | ............. | F16C 33/3862 |

FOREIGN PATENT DOCUMENTS

EP   2743527 A1   6/2014

OTHER PUBLICATIONS

U.S. Appl. No. 16/751,917, filed Jan. 24, 2020 (unpublished).

* cited by examiner

*Primary Examiner* — James Pilkington
(74) *Attorney, Agent, or Firm* — Volpe Koenig (57) ABSTRACT

A bearing cage assembly is disclosed that includes two sub-assemblies. Both cage sub-assemblies include a shell half formed from plastic, and defining a plurality of rolling element pockets and openings. Each sub-assembly also includes a frame half formed from metal, and including a rim and a plurality of crossbars. The shell halves are overmolded with the frame halves. The first cage sub-assembly and the second cage sub-assembly are connected to each other via insertion of the crossbars into the openings of the other sub-assembly, such that free ends of the crossbars engage the other rim.

20 Claims, 13 Drawing Sheets

TWO-PIECE HYBRID BEARING CAGE ASSEMBLY

FIELD OF INVENTION

The present disclosure relates to a bearing cage assembly, and is more particularly related to a two-piece hybrid bearing cage assembly.

BACKGROUND

There is an increasing demand for fuel efficient and environmentally friendly automotive drive systems. As a result, drive systems for automobiles and other vehicles are becoming increasingly reliant on electrical motors. This shift requires more bearings in order to support the high rotational speeds experienced by components in electric motors.

Bearing assemblies, such as deep groove ball bearing assemblies, generally require cages to support the ball bearings and space the balls from each other. However, traditional single-piece cages experience issues due to the high speeds associated with electric motors. In order to accommodate high speeds, cage designs are increasingly relying on a two-piece or hybrid cage configuration. Two-piece cages formed entirely from plastic are not suitable for the high rotational speeds (i.e. 50,000 rpm) experienced by electric motors. Existing two-piece plastic cages typically experience failure around 30,000 rpm and are not capable of withstanding the performance demands of electric motors.

It would be desirable to provide a light-weight, cost-effective, and reliable bearing cage that performs in high speed applications.

SUMMARY

The bearing cage disclosed herein includes a plastic cage and a metal skeleton (i.e. frame) with metal fingers (i.e. crossbars) such that the metal skeleton and fingers primarily experience centrifugal load from high speed bearing rotation, while also handling high thermal expansion from the bearing cage running at high temperatures (i.e. at least 150 degrees Celsius).

The bearing cage assembly disclosed herein includes two cage sub-assemblies, essentially including identical features. The first cage sub-assembly includes a first shell half formed from plastic. The first shell half defines a plurality of rolling element pockets and a first plurality of openings. A first frame half is formed from metal, and the first frame half includes a first rim and a first plurality of crossbars. The first shell half is overmolded with the first frame half. A second cage sub-assembly includes a second shell half formed from plastic. The second shell half defines a plurality of rolling element pockets and a second plurality of openings. A second frame half is formed from metal, and the second frame half includes a second rim and a second plurality of crossbars. The second shell half is overmolded with the second frame half. The first cage sub-assembly and the second cage sub-assembly are connected to each other via insertion of the first plurality of crossbars into the second plurality of openings and insertion of the second plurality of crossbars into the first plurality of openings. Free ends of the first plurality of crossbars engage the second rim, and free ends of the second plurality of crossbars engage with the first rim to secure the first cage sub-assembly with the second cage sub-assembly.

In one embodiment, the first rim and the second rim each have a varying width along a circumferential direction.

In one embodiment, the first plurality of crossbars are positioned to abut the first rim in a widest region of the first rim, and the second plurality of crossbars are positioned to abut the second rim in a widest region of the second rim.

In one embodiment, each crossbar of the first plurality of crossbars and the second plurality of crossbars includes an axially extending section with radially outwardly extending flanges on both axial ends of the axially extending section.

The first frame half and the second frame half can be separately formed from each other.

The first rim and the first plurality of crossbars can be integrally formed with each other, and the second rim and the second plurality of crossbars can be integrally formed with each other.

In another embodiment, the first rim and the first plurality of crossbars are separately formed from each other, and the second rim and the second plurality of crossbars are separately formed from each other.

The first shell half and the second shell half each generally include a base rim and a plurality of axially extending fingers.

The first shell half and the second shell half are each formed from a thermoplastic polymer or a high heat polyamide.

The first frame half and the second frame half are each formed from steel.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A bearing cage assembly 10, 110 is shown in the drawings which essentially consists of a plastic shell 20 and a metal frame or skeleton 40. The shell 20 is molded over the frame 40 to form the bearing cage assembly 10. The underlying metal frame or skeleton 40 provides increased support for the overmolded plastic shell 20.

Figure 6A:
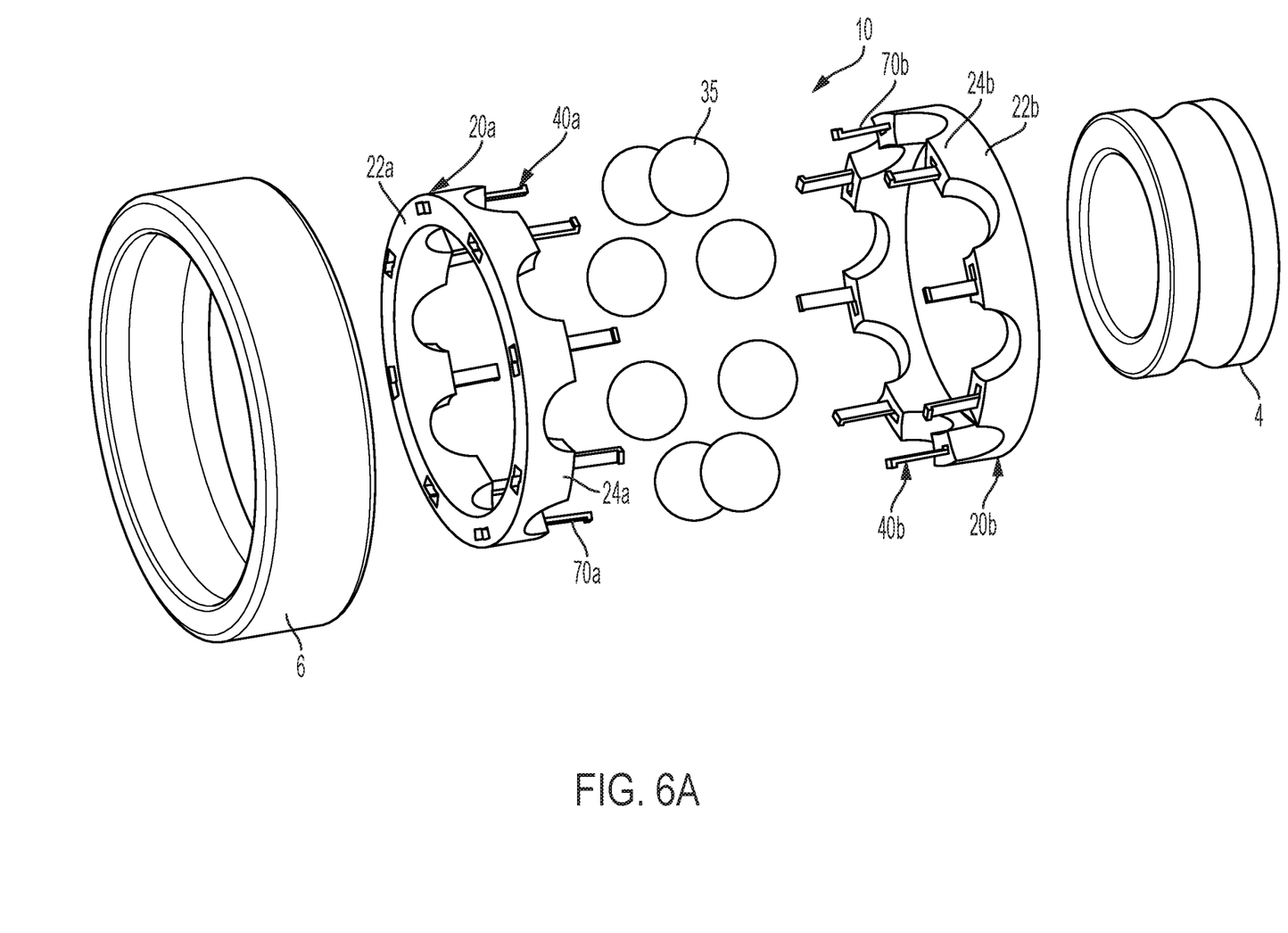
FIG. 6A is an exploded view of a bearing cage assembly.
Figure 6B:
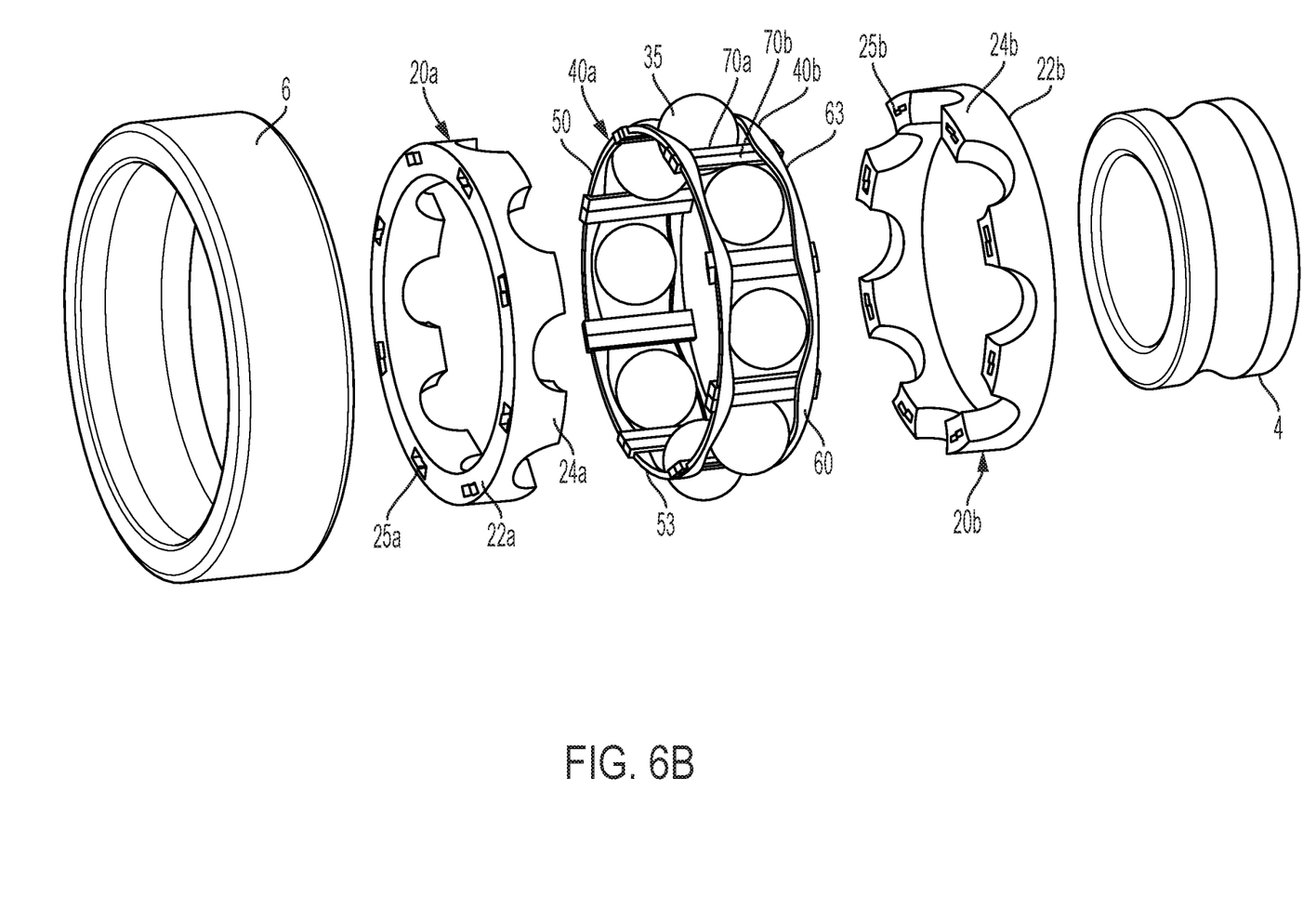
FIG. 6B is another exploded view of the bearing cage assembly of FIG. 6A.

The bearing cage assembly 10 can be used in conjunction with an inner bearing ring 4 and an outer bearing 6 as shown in FIGS. 6A and 6B. The specific type of bearing application can vary, but the bearing cage assembly 10 can specifically be used in a deep groove ball bearing configuration.

In one embodiment, the shell 20 is formed from a thermoplastic polymer or a high heat polyamide. In one embodiment, the shell 20 is formed from PA46-GF30, PA66-GF30, or polyether ether ketone (PEEK). One of ordinary skill in the art would understand, based on this disclosure, that other plastics or materials can be used to form the shell 20. The shell 20 defines a plurality of rolling element pockets 30, which are dimensioned to receive rolling elements 35.

Figure 2:
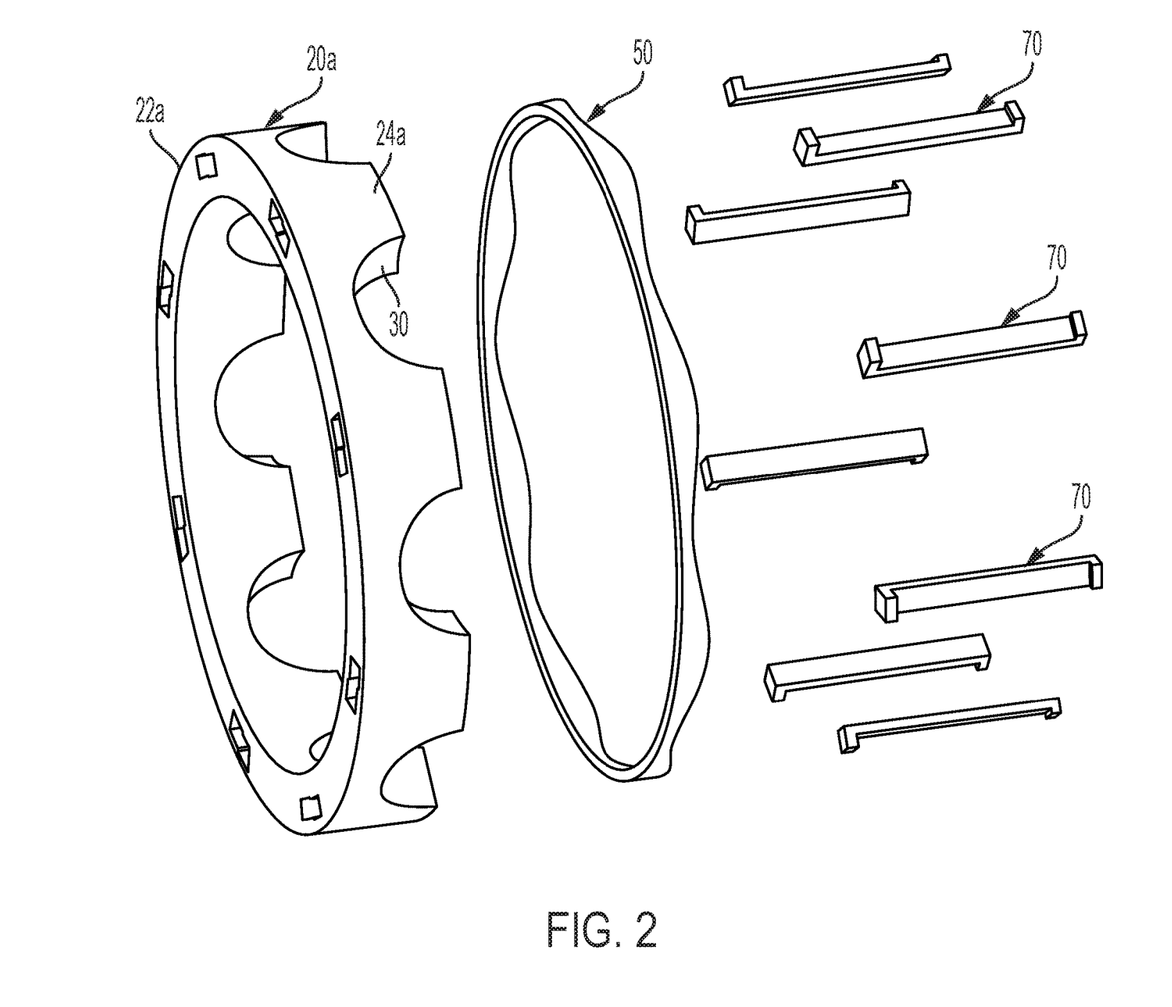
FIG. 2 is an exploded view of one half of a bearing cage assembly including a shell and frame.

The shell 20 is formed via a first shell half 20a and a second shell half 20b. The first shell half 20a is shown in more detail in FIG. 2. One of ordinary skill in the art would understand that the second shell half 20b includes identical features as the first shell half 20a. The first shell half 20a and the second shell half 20b each include a base rim 22a, 22b and a plurality of axially extending fingers 24a, 24b. The fingers 24a, 24b define openings 25a, 25b, 125a, 125b that are dimensioned to receive crossbars 70 from a respective frame halve 40a, 40b. The first shell half 20a and the second shell half 20b combine to form the rolling element pockets 30, which are identified in a partially formed state prior to assembly in FIG. 2. Each of the shell halves 20a, 20b define a portion of the rolling element pockets 30.

The frame 40 generally includes a first rim 50, a second rim 60 spaced apart from the first rim 50, and a plurality of crossbars 70 connecting the first rim 50 and the second rim 60. In one embodiment, the frame 40 is formed from steel, and can be case hardened. One of ordinary skill in the art would understand from this disclosure that other high strength metals or materials can be used to form the frame 40. Multiple variations and features of the frame 40 are described herein.

Figure 1A:
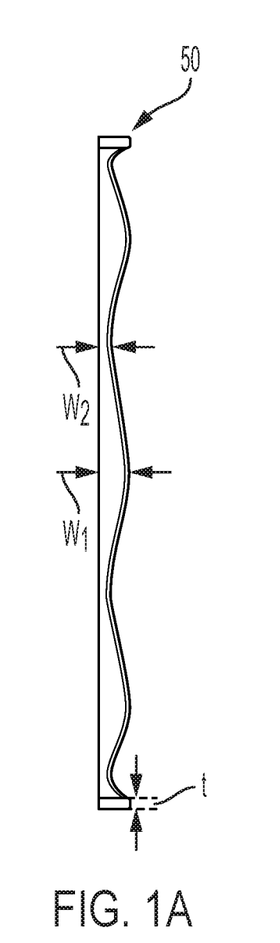
FIG. 1A is a side view of a first rim of a frame for a bearing cage assembly.
Figure 1B:
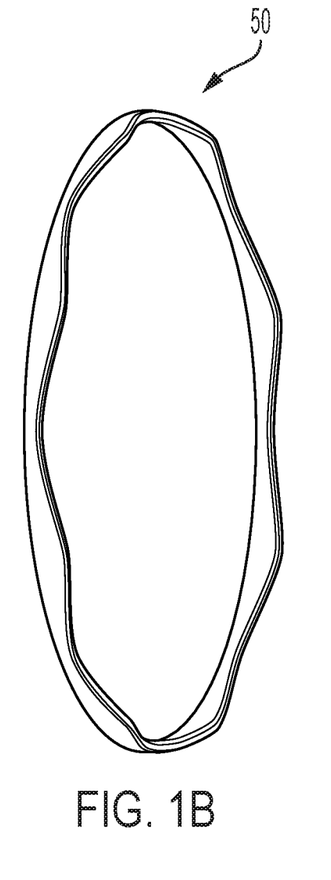
FIG. 1B is a perspective view of the first rim of FIG. 1A.
Figure 1C:
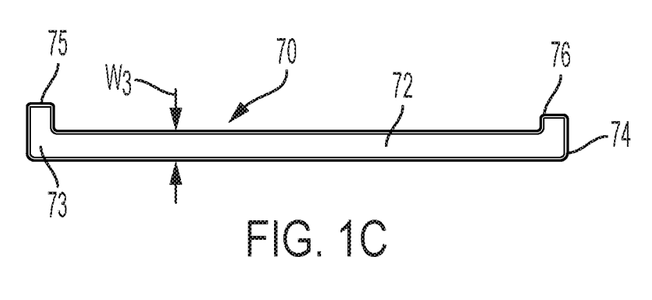
FIG. 1C is a side view of a crossbar of a frame for a bearing cage assembly.
Figure 1D:
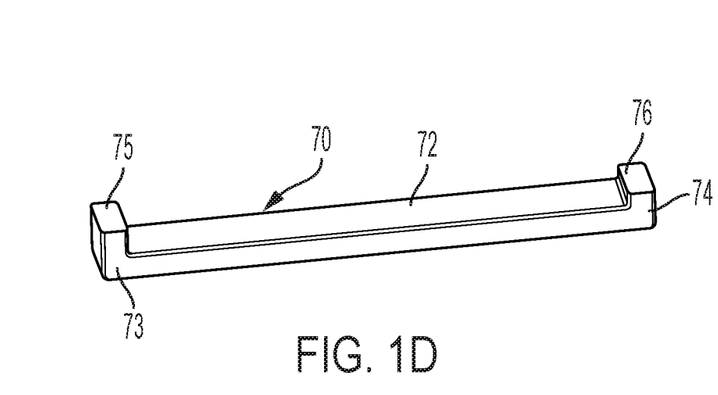
FIG. 1D is a perspective view of the crossbar of FIG. 1C.

As shown in FIGS. 1A and 1B, the first rim 50 (as well as the second rim 60, which is not shown in FIGS. 1A and 1B) has a varying width along a circumferential direction. As used herein, the term width with respect to the rim 50 a width of the rim 50 measured in the axial direction.

The rim 50 has a greater or maximum width ($w_1$) in a region of contact with the crossbars 70 and a reduced or minimum width ($w_2$) in regions away from the crossbars 70. This varying width is selected to provide stronger areas for the crossbars 70 to connect and contact with the rim 50, and also reduce the weight of the frame 40 by reducing the width in areas that experience lower stress and loads. Additionally, the increased width in areas of the frame 40 provides greater contact area with the overmolded plastic shell 20. As a result, there is a reduction in stress for both the shell 20 and the frame 40.

In one embodiment, a thickness (t) of the frame 40 is greater than or equal to 0.75 mm. The reduced or minimum width ($w_2$) of the rim 50 is greater than or equal to 1.4*(t). The greater or maximum width ($w1$) of the rim 50 is greater than or equal to 3*(t). A minimum width ($w_3$) of the crossbars 70 is greater than or equal to 2.5*(t). The thicknesses and widths of the frame 40 and crossbars 70 are selected to be optimized for both weight reduction, while also providing sufficient strength to withstand centrifugal forces of a bearing speed of 50,000 rpm or higher, as well as the force caused by plastic thermal expansion of the plastic shell 20. One of ordinary skill in the art would understand that these dimensions can be selected to accommodate varying load characteristics of different types of bearing assemblies of varying sizes and running speeds.

Figure 3:
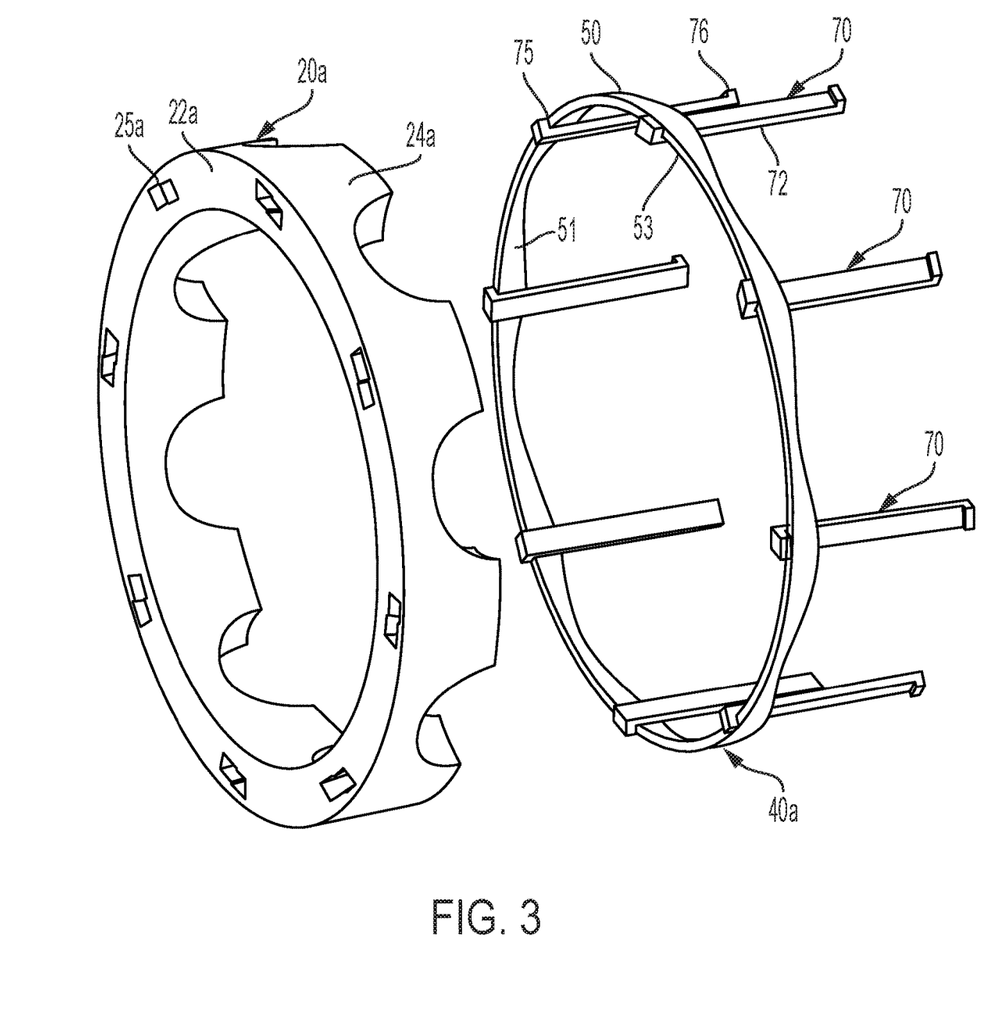
FIG. 3 is an exploded view of one half of the bearing cage assembly of FIG. 2 with the frame in a partially assembled state.

In one embodiment, as best shown in FIG. 3, the plurality of crossbars 70 are positioned to abut the first rim 50 and the second rim 60 in a widest region of the first rim 50 and the second rim 60.

In one embodiment, each crossbar 70, 70a, 70b includes an axially extending section 72, 72a with radially outwardly extending flanges 75, 75a, 75b, 76, 76a, 76b, 176 on both axial ends 73, 73a, 73b, 74, 74a, 74b, 174, 174a, 174b of the axially extending section 72. This configuration generally has a U-shaped profile when viewed in a circumferential direction. A height of one of the radially outwardly extending flange 75 is greater than a height of the other one of the radially outwardly extending flange 76. One of ordinary skill in the art would understand that the geometry and height of these components can vary.

The frame 40 includes a first frame half 40a and a second frame half 40b. The first frame half 40a and the second frame half 40b can be identical to each other. The first frame half 40a includes the first rim 50 and a first set 70a of the plurality of crossbars 70.

In one embodiment, shown in FIGS. 1A-1D, 2, 3, and 6B-6E, the first rim 50, the second rim 60, and the plurality of crossbar 70 are separately formed from each other. In this embodiment, as shown in FIG. 3, the axially extending section 72 of the plurality of crossbars 70 abut radially inner surfaces 51, 61 of the first rim 50 and the second rim 60, and the radially outwardly extending flanges 75, 76 abut axial surfaces 53, 63 of the first rim 50 and the second rim 60.

During assembly, the first shell half 20a is overmolded with the first rim 50 and first crossbar 70a, and the second shelf half 20b is overmolded with the second rim 60 and the second crossbar 70b. For assembly, the crossbars 70 and the rim 50 are placed into a molding tool set as shown in FIG. 3, then the plastic shell half 20a is molded over the crossbars 70/frame 50 sub-assembly.

Figure 6C:
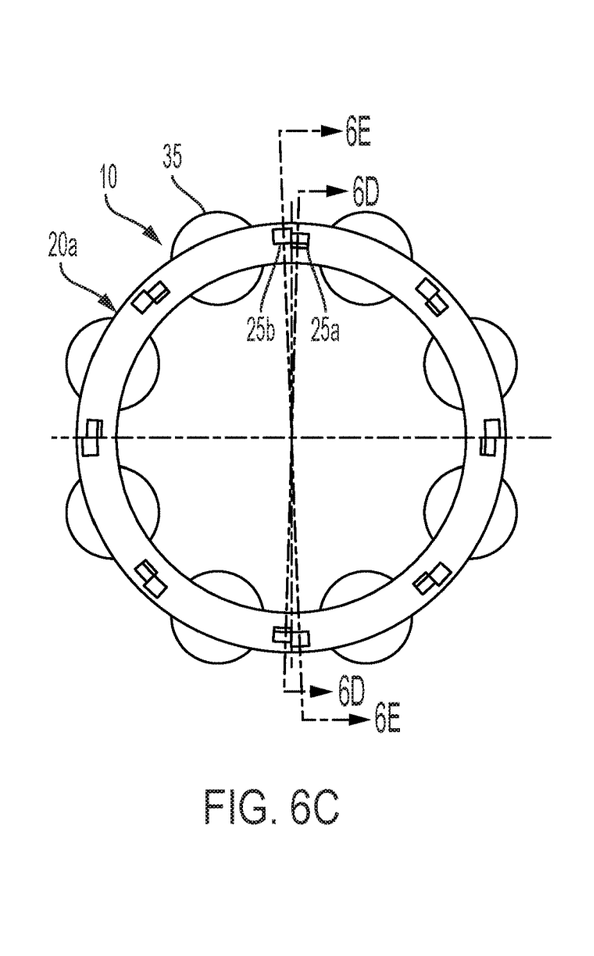
FIG. 6C is a front view of the bearing cage assembly of FIGS. 6A and 6B.
Figure 6D:
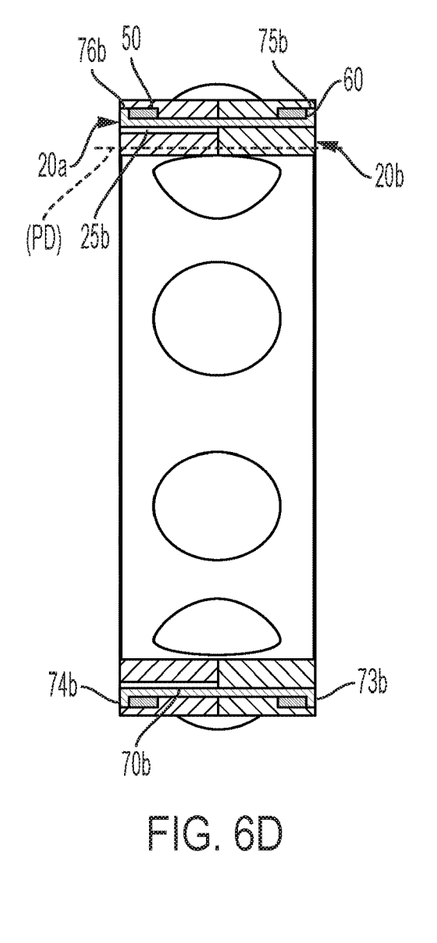
FIG. 6D is a cross-sectional view of the bearing cage assembly along line 6D-6D from FIG. 6C.
Figure 6E:
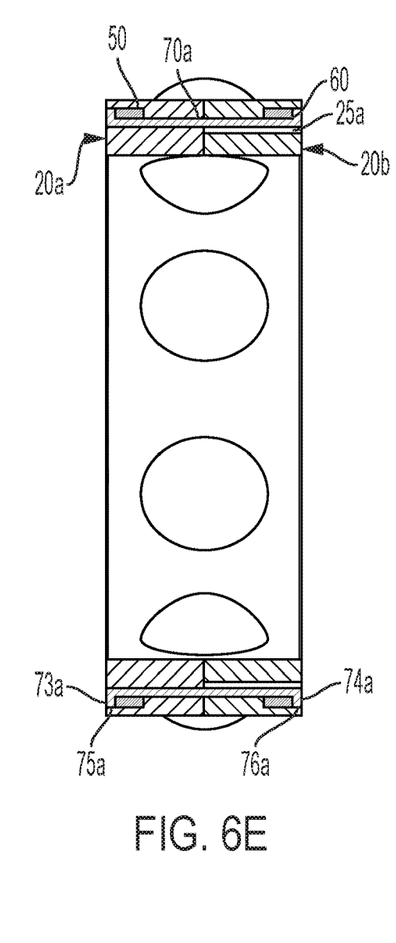
FIG. 6E is a cross-sectional view of the bearing cage assembly along line 6E-6E from FIG. 6C.

As shown in FIG. 6C-6E, the first shell half 20a and the second shell half 20b each define a plurality of openings 25a, 25b. In order to assembly the bearing cage, the plurality of crossbars 70 are snapped into engagement within the plurality of openings 25a, 25b to connect the first shell half 20a with the second shell half 20b. As best shown in FIG. 6C-6E, each cage half includes openings 25a to receive a respective crossbar 70a, 70b from the first and second frame halves 40a, 40b.

Figure 4:
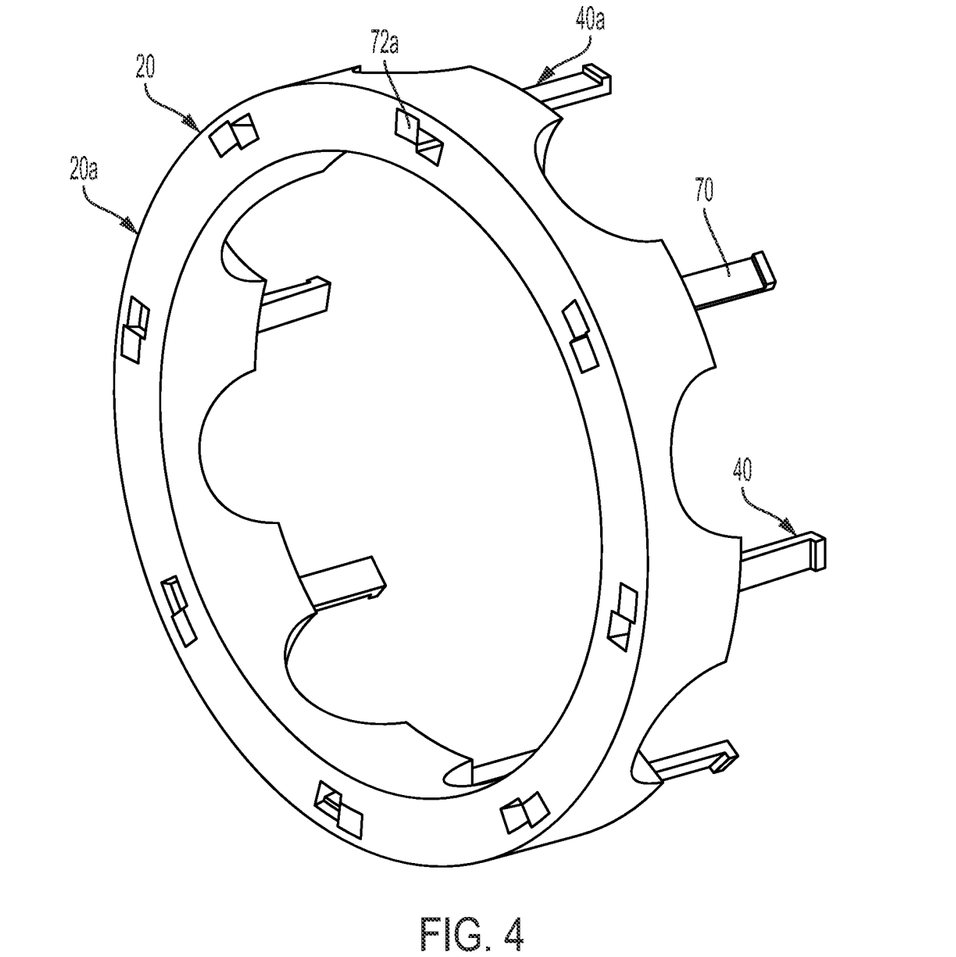
FIG. 4 is a perspective view of one half of the bearing cage assembly in an assembled state.
Figure 5:
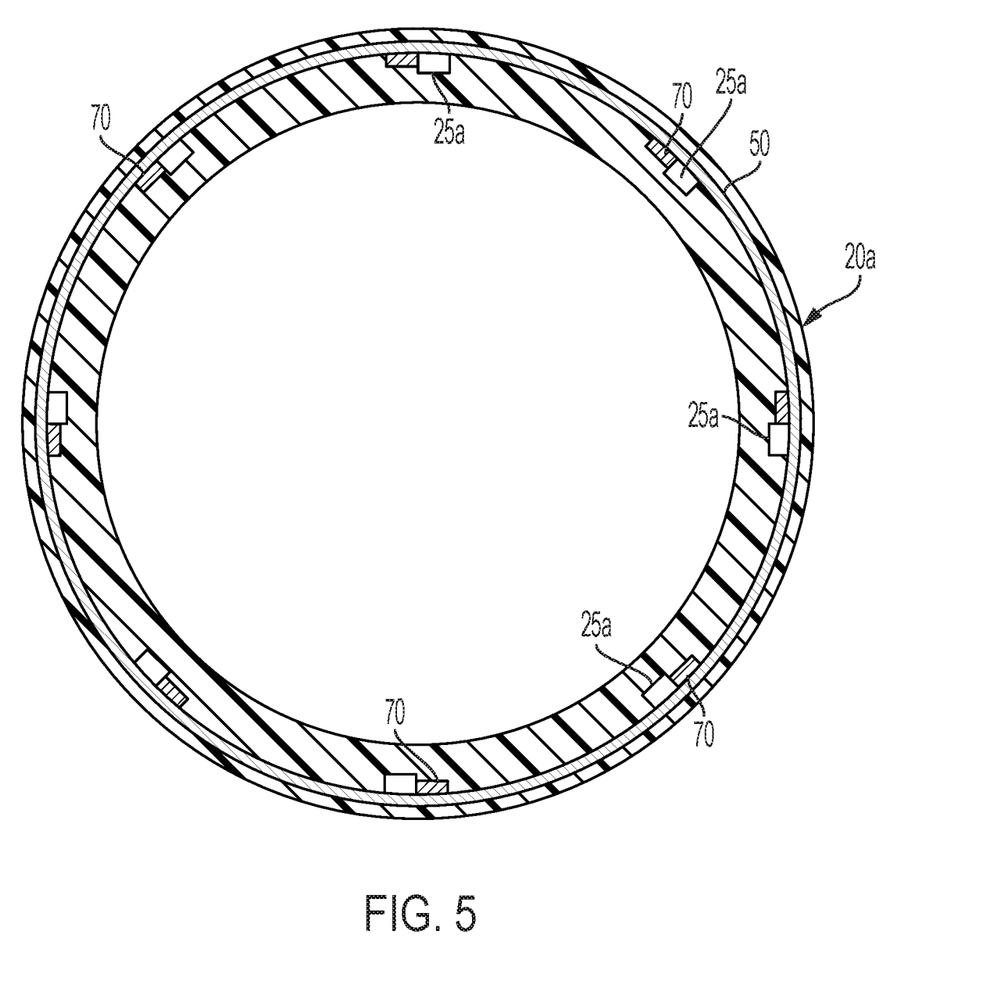
FIG. 5 is a front view of one half of the bearing cage assembly of FIG. 4.

An overmolded cage half 20a is shown in FIG. 4, which shows the first shell half 20a overmolded with the first frame half 40a. The first shell half 20a overmolded with the first frame half 40a is also shown in FIG. 6A, which also illustrates the second shell half 20b overmolded with the second frame half 40b.

Figure 7A:
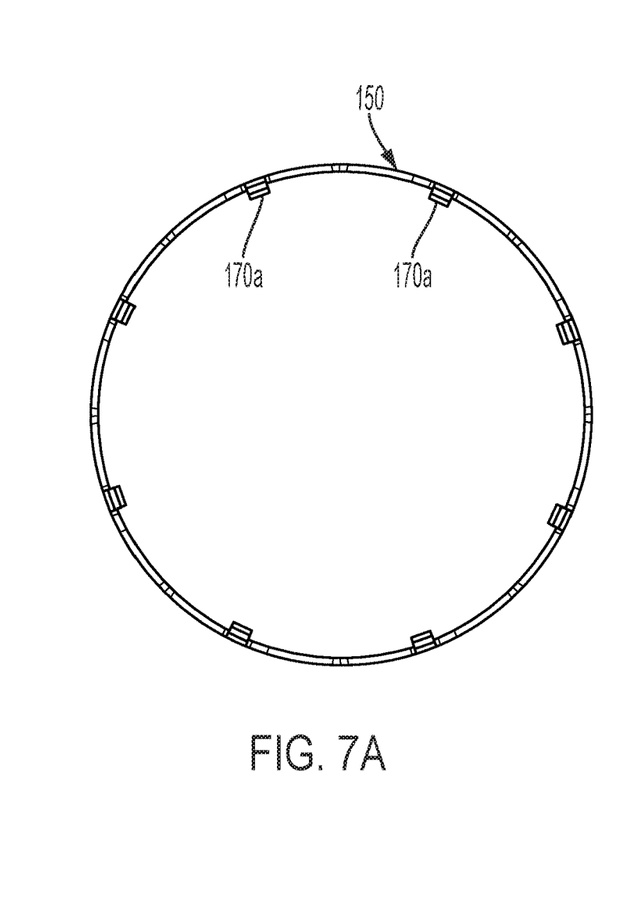
FIG. 7A is a front view of another embodiment of a rim of a frame for a bearing cage assembly.
Figure 7B:
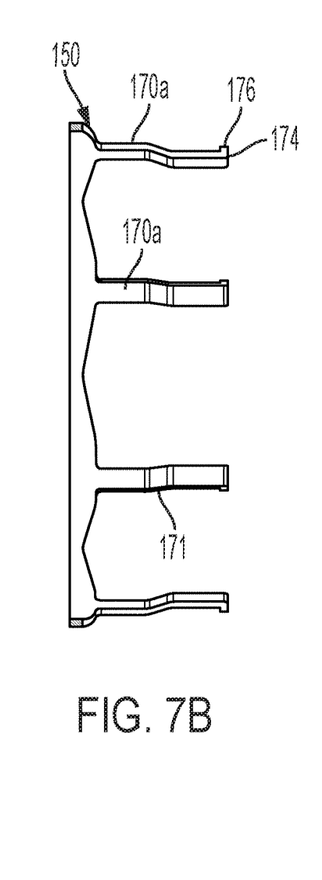
FIG. 7B is a side view of the rim of FIG. 7A.
Figure 7C:
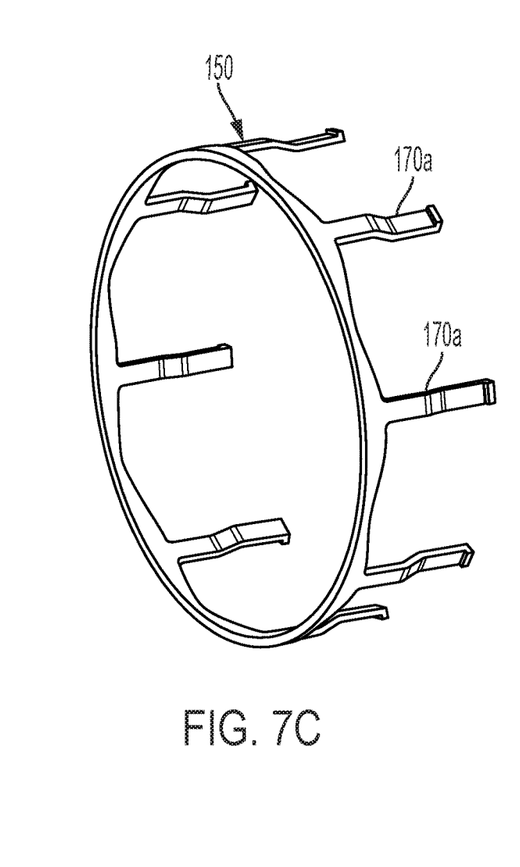
FIG. 7C is a perspective view of the rim of FIGS. 7A and 7B.
Figure 8A:
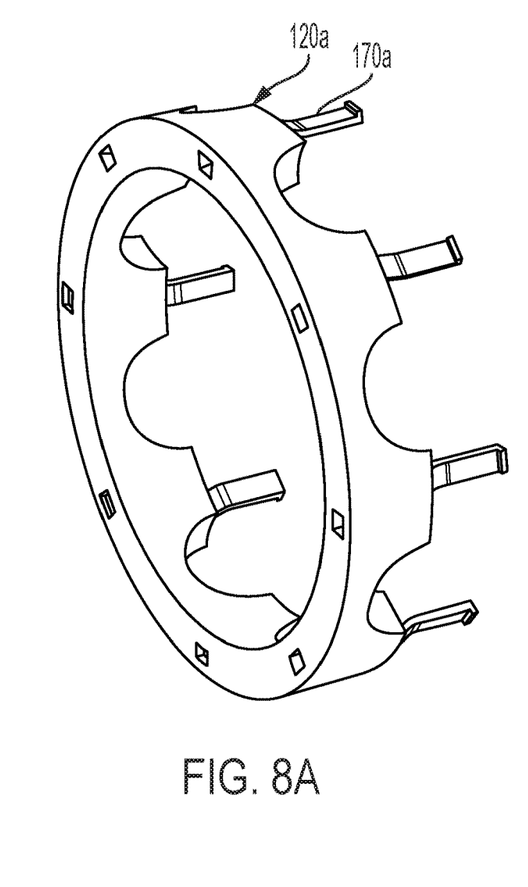
FIG. 8A is a perspective view of a partially assembled cage half.
Figure 8B:
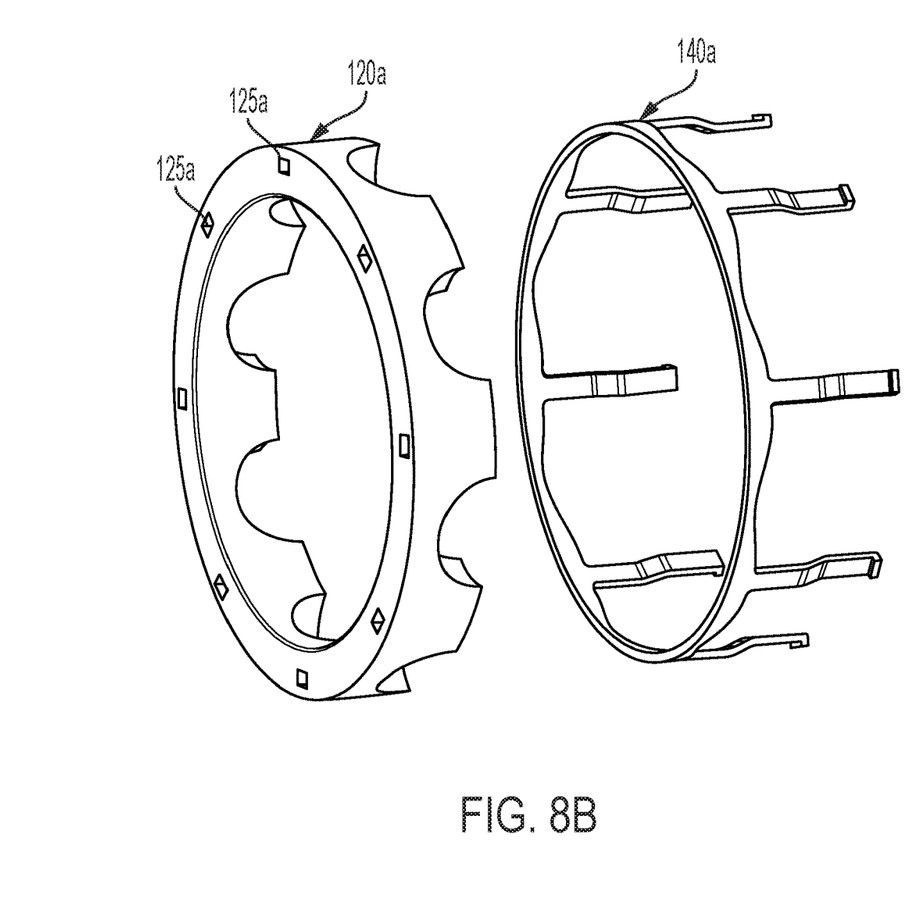
FIG. 8B is an exploded view of the cage half from FIG. 8A.
Figure 9A:
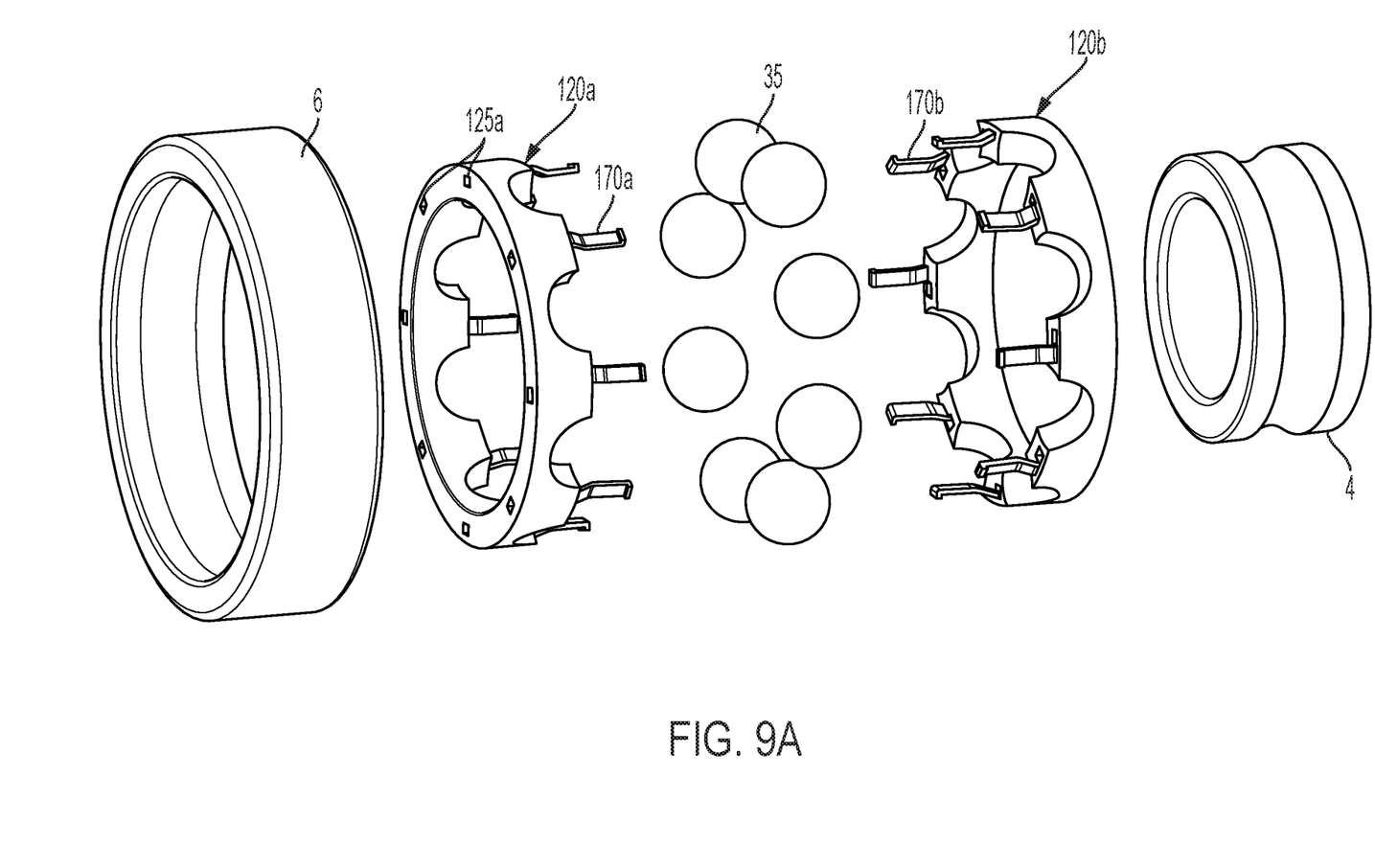
FIG. 9A is an exploded view of another embodiment of a bearing cage assembly.
Figure 9B:
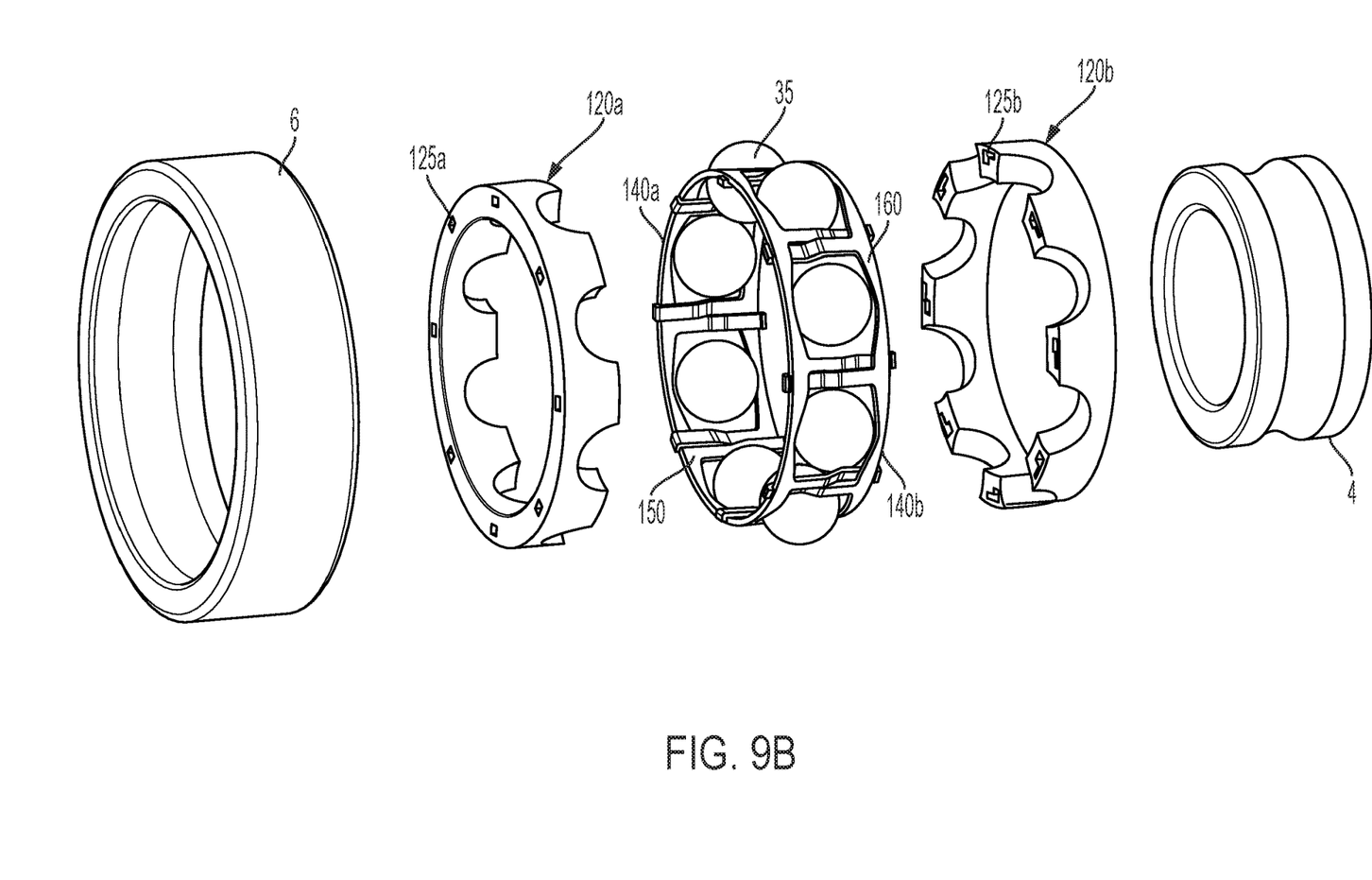
FIG. 9B is another exploded view of the bearing cage assembly of FIG. 9A.
Figure 9C:
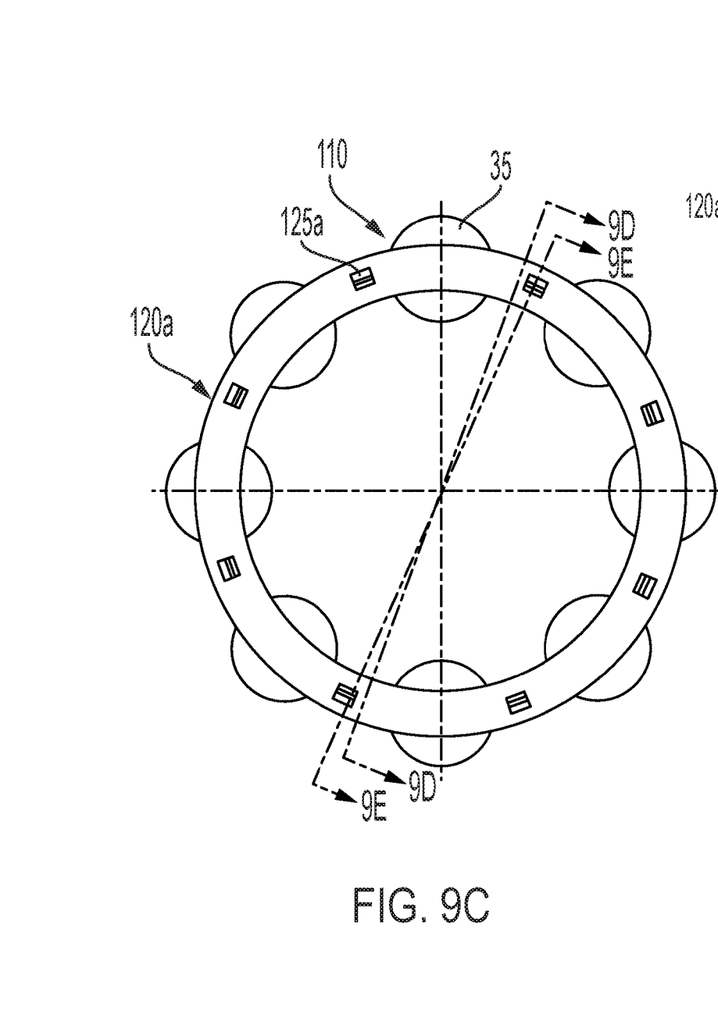
FIG. 9C is a front view of the bearing cage assembly of FIGS. 9A and 9B.
Figures 9D, 9E:
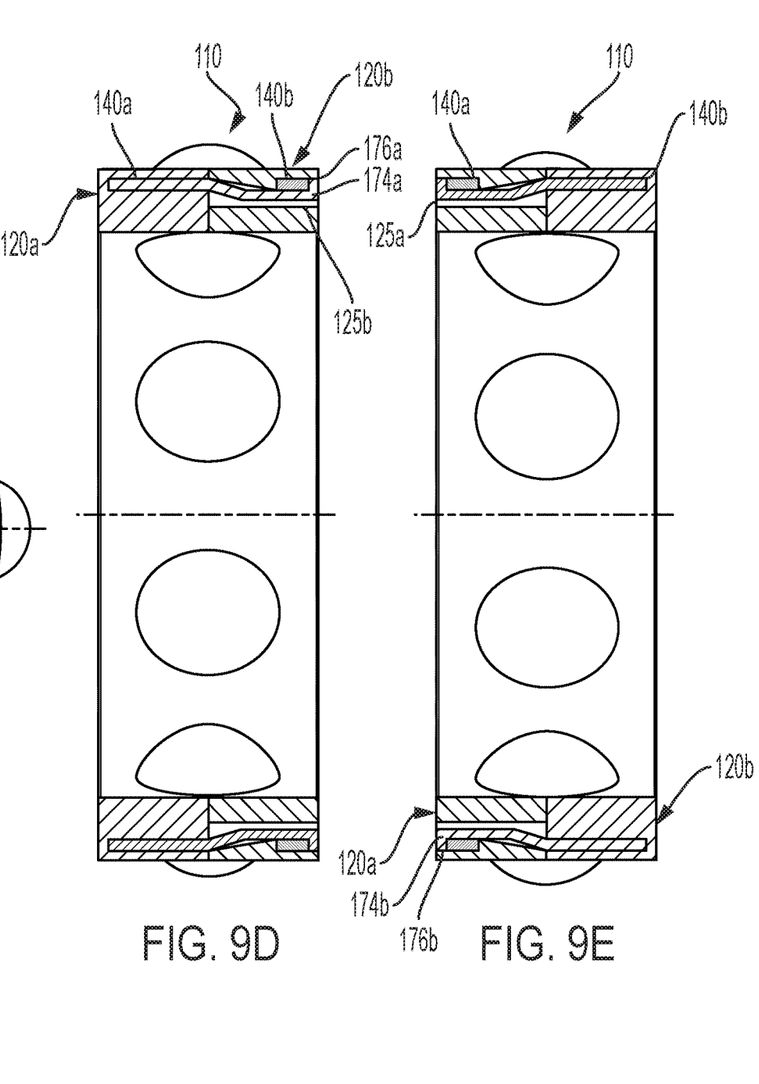
FIG. 9D is a cross-sectional view of the bearing cage assembly along line 9D-9D from FIG. 9C.
FIG. 9E is a cross-sectional view of the bearing cage assembly along line 9E-9E from FIG. 9C.

In one embodiment, shown in FIGS. 7A-7C, 8A, 8B, 9A-9E, the first rim 150 and the first set 170a of the plurality of crossbars are integrally formed with each other. In this embodiment, the second rim 160 and the second set 170b of the plurality of crossbars are also integrally formed with each other. As shown in FIGS. 7B and 7C, the crossbars 170a have a bent section 171 in a medial region. The frame of FIGS. 7A-7C, 8A, 8B, 9A-9E makes assembly and molding simpler and less time consuming than other embodiments.

In the embodiment of FIGS. 7A-7C, 8A, 8B, and 9A-9E, the plastic cage halves 120a, 120b are essentially identical to the cage halves 20a, 20b, except the crossbar 170a, 170b are not straight, instead the crossbars 170a, 170b include a bent section or a step-down in the middle. The frames 40a, 40b in FIGS. 1A-6E also include separately formed crossbars 70a, 70b, while the frames 140a, 140b in FIGS. 7A-7C, 8A, 8B, and 9A-9E include integrally formed crossbars 170a, 170b.

As best shown in FIGS. 6D, 6E, 9D, and 9E, the cage halves 20a, 20b, 120a, 120b are pressed into each other such that ends of the respective crossbars 70a, 70b, 170a, 170b engage with opposing rims 50, 60, 150, 160 and the cage halves 20a, 20b, 120a, 120b are retained with each other. The resulting connection between the cage halves 20a, 20b, 120a, 120b is provided via a snap-fit between the frames 40a, 40b, 140a, 140b of the two cage halves 20a, 20b, 120a, 120b. As best shown in FIGS. 6D, 6E, 9D, and 9E, the radially outwardly extending flanges 76a, 76b, 176, 176a, 176b defined on free ends of the crossbars 70a, 70b, 170a, 170b provide an abutting engagement with the opposing rims 50, 60, 150, 160.

A dashed line representing the pitch diameter (PD) of the bearing assembly is shown in FIG. 6D. As shown in this drawing, the crossbars 70a and rims 50, 60 are positioned radially outward from the pitch diameter (PD). In other words, the pitch diameter (PD) is located radially inward from the first frame half 40a and the second frame half 40b. This configuration accommodates thermal shrinking of the materials forming the cage assembly in extreme low temperatures.

The two cage halves disclosed herein can be quickly and easily assembled by personnel by pressing the two cage halves into each other. In one embodiment, the assemblies disclosed herein can be assembled according to the Conrad method, i.e. the inner ring is arranged in an eccentric position relative to the outer ring, and then inserting the rolling elements in a gap between the rings. Other assembly methods can be used to assemble the bearing.

A method of assembling a bearing assembly is also disclosed herein. The method includes providing the two shell halves 20a, 20b with the respective frame halves 40a, 40b, and then pressing the two shell halves 20a, 20b into each other such that the crossbars 70a, 70b engage the opposing rim 50, 60. A snap-fit connection is provided by engaging the crossbars 70a, 70b with the opposing rims 50, 60. In the fully assembled state, as best shown in FIGS. 6D, 6E, 9D, and 9E, the two cage halves 20a, 20b, 120a, 120b directly abut each other and are flush with each other.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

What is claimed is:

1. A bearing cage assembly comprising:
   a first cage sub-assembly including:
      a first shell half formed from plastic, the first shell half defining a first portion of a plurality of rolling element pockets and a first plurality of openings;
      a first frame half formed from metal, the first frame half including a first rim and a first plurality of crossbars;
      wherein the first shell half is overmolded on the first frame half;
   a second cage sub-assembly including:
      a second shell half formed from plastic, the second shell half defining a second portion of the plurality of rolling element pockets and a second plurality of openings;
      a second frame half formed from metal, the second frame half including a second rim and a second plurality of crossbars;
   wherein the second shell half is overmolded on the second frame half; and
   the first cage sub-assembly and the second cage sub-assembly are connected to each other via insertion of the first plurality of crossbars into the second plurality of openings and insertion of the second plurality of crossbars into the first plurality of openings such that free ends of the first plurality of crossbars engage the second rim, and free ends of the second plurality of crossbars engage with the first rim.

2. The bearing cage assembly of claim 1, wherein a snap-fit connection is provided between the free ends of the first plurality of crossbars and the second rim, and a snap-fit connection is provided between the free ends of the second plurality of crossbars and the first rim.

3. The bearing cage assembly of claim 1, wherein the first rim and the second rim each have a varying width along a circumferential direction.

4. The bearing cage assembly of claim 3, wherein the first plurality of crossbars are positioned to abut the first rim in a widest region of the first rim, and the second plurality of crossbars are positioned to abut the second rim in a widest region of the second rim.

5. The bearing cage assembly of claim 1, wherein each crossbar of the first plurality of crossbars and the second plurality of crossbars includes an axially extending section with radially outwardly extending flanges on both axial ends of the axially extending section.

6. The bearing cage assembly of claim 1, wherein the first frame half and the second frame half are separately formed from each other.

7. The bearing cage assembly of claim 6, wherein the first rim and the first plurality of crossbars are integrally formed with each other, and the second rim and the second plurality of crossbars are integrally formed with each other.

8. The bearing cage assembly of claim 1, wherein the first rim and the first plurality of crossbars are separately formed from each other, and the second rim and the second plurality of crossbars are separately formed from each other.

9. The bearing cage assembly of claim 1, wherein the first shell half and the second shell half each include a base rim and a plurality of axially extending fingers.

10. The bearing cage assembly of claim 1, wherein the first shell half and the second shell half are each formed from a thermoplastic polymer or polyamide.

11. The bearing cage assembly of claim 1, wherein the first frame half and the second frame half are each formed from steel.

12. The bearing cage assembly of claim 1, further comprising rolling elements within the plurality of rolling element pockets, wherein a pitch diameter of the rolling elements is positioned radially inward from the first frame half and the second frame half.

13. The bearing cage assembly of claim 1, wherein a thickness (t) of the first rim and the second rim is greater than or equal to 0.75 mm, a minimum width (w2) of the first rim and the second rim is greater than or equal to $1.4*(t)$, and a maximum width (w1) of the first rim and the second rim is greater than or equal to $3*(t)$.

14. The bearing cage assembly of claim 13, wherein a minimum width (w3) of the first plurality of crossbars and the second plurality of crossbars is greater than or equal to $2.5*(t)$.

15. A bearing cage assembly comprising:
two cage sub-assemblies each including:
a shell half formed from plastic that defines a portion of a plurality of rolling element pockets;
a frame half formed from metal that includes a rim and a plurality of crossbars;
wherein each shell half is overmolded on each frame half;
the two cage sub-assemblies are connected with each other in an assembled state via engagement of free ends of the plurality of crossbars with opposing ones of the rims of the frame halves.

16. The bearing cage assembly of claim 15, wherein the rims each have a varying width along a circumferential direction.

17. The bearing cage assembly of claim 15, wherein the rims are formed integrally with the plurality of crossbars.

18. The bearing cage assembly of claim 15, wherein the rims are formed separately from the plurality of crossbars.

19. The bearing cage assembly of claim 15, further comprising rolling elements within the plurality of rolling element pockets, wherein a pitch diameter of the rolling elements is positioned radially inward from the frame halves.

20. The bearing cage assembly of claim 15, wherein axially inner faces of the two cage sub-assemblies abut each other in the assembled state.

* * * * *